United States Patent [19]

Kurty

[11] Patent Number: 5,164,004
[45] Date of Patent: Nov. 17, 1992

[54] HIGH PERMEABILITY METAL CASTING PLASTER AND METHOD OF MAKING SAME

[76] Inventor: Eugene J. Kurty, Rte. 3, Hohenwald, Tenn. 38462

[21] Appl. No.: 592,618

[22] Filed: Oct. 3, 1990

[51] Int. Cl.$^5$ .......................... C04B 7/04; C04B 11/30
[52] U.S. Cl. ............................... 106/38.35; 106/38.25; 106/38.27; 106/735; 106/782
[58] Field of Search ............... 106/726, 691, 735, 781, 106/782, 38.27, 38.35, 38.25; 264/42

[56] References Cited

U.S. PATENT DOCUMENTS

| | | | |
|---|---|---|---|
| 2,753,608 | 7/1956 | Nolan | 106/38.35 |
| 2,861,893 | 11/1958 | Brewster | 106/38.35 |
| 3,748,290 | 7/1973 | Reingen | 260/2.5 F |
| 4,127,628 | 11/1978 | Uchida et al. | 264/42 |
| 4,749,431 | 6/1988 | Fassle et al. | 156/245 |
| 4,818,287 | 4/1989 | Ravins et al. | 106/775 X |

FOREIGN PATENT DOCUMENTS 2058727  9/1969  France.

Primary Examiner—William R. Dixon, Jr.
Assistant Examiner—Lisa M. Schull
Attorney, Agent, or Firm—Mark J. Patterson

[57] ABSTRACT

A high permeability metal casting plaster is used for production of high accuracy simulated castings for prototypes and any other plastermold castings. Methods are provided that create the high permeability metal casting plaster and mold. Also, a high permeability metal casting plaster is disclosed that uses control ground and screened α-hemihydrate gypsum such that an average of 100% of the particles have a diameter of no more than 590 μm and an average of 97.3% have a diameter of less that 44 μm, control ground and screened beta-hemihydrate gypsum such that an average of 99% of the particles have a diameter of no more than 270 μm and at least an average of 70% have a diameter of less than 44 μm, sucrose for protection against thermal shock, and a foaming agent. The ratio of α-hemihydrate gypsum to β-hemihydrate gypsum is approximately 5:2.

5 Claims, No Drawings

HIGH PERMEABILITY METAL CASTING PLASTER AND METHOD OF MAKING SAME

BACKGROUND OF THE INVENTION

The present invention relates to a high permeability casting plaster and more particularly to a metal casting plaster of high permeability that allows any plastermold castings and in particular the simulated die casting of parts used primarily for the creation of prototype and short run production parts which will substantially replicate the appearance and function of conventionally die cast parts.

It will be appreciated by those skilled in the art that the use of gypsum-type materials in the manufacture of molds used for casting of metals is well known. The need for inexpensive simulated die casting is particularly important for the creation of prototype or short run production parts which can be tested prior to the outlay of large sums of money to develop a permanent steel die. To this end, there have been several attempts to provide such a plaster for allowing the creation of prototype and short run production parts.

One such attempt is disclosed by R. Reingen in U.S. Pat. No. 3,748,290. The Reingen patent briefly mentions the use of the addition of certain chemicals to a hemihydrate gypsum. The specific application of Reingen is directed toward ceramic molding. However, Reingen does mention that his method has had certain success with the manufacture of other molds, patterns, and pressed pieces. However, the Reingen patent does not create the thin wall casting that is required to develop prototypes.

U.S. Pat. No. 4,749,431 issued to Fassle et al. on Jun. 7, 1988, discloses the use of alpha and beta hemihydrates that are added to glass fibers. However, this disclosure, too, does not describe the simulated die casting that is required to cast a prototype piece.

Several problems have plagued the aluminum/zinc alloy casting industry for many years. For example, the wall thickness of the metal castings vary due to irregularities in the surface of the mold. Also, turbulence in the molten metal caused by gases trapped in the mold cavity have caused poor metal wall structure. Further, low strength mold walls separate and crack under high temperatures or pressure, resulting in flashings or fins on the metal walls of the casting. Conventional casting plasters, when cured, have also lacked the uniform permeability necessary to provide uniform gas diffusion through and cooling of the molten metal during casting.

What is needed, then, is a high permeability metal casting plaster than can be used inexpensively to create simulated die castings. This needed plaster must produce a harder and smoother skin on the plaster mold. This plaster must also hold the foam cells in the plaster mold in uniform suspension. To prevent large, irregular foam cells from forming directly behind the skin, which causes the collapse of the mold wall under the weight of the molten alloy, the plaster must promote uniform density throughout the finished plaster mold. The plaster must also control cracking and micro-cracking of the mold surface that is caused by thermal expansion during drying and subsequent exposure to high temperature by the molten alloy. A plaster having these qualities and characteristics is presently lacking in the art.

SUMMARY OF THE INVENTION

The present invention relates to the manufacture of simulated die castings using a mold formed of permeable casting plaster. A master model is produced from blueprints supplied by the customer having the shape, dimensions, and finish qualities of the desired cast metal end-product. A cavity or negative is then made by investing rubber and plastic over the master model. From the negative of the master model, a positive of the master model is then produced of rubber and plastic which is called a pattern tooling. The pattern tooling is then placed in a frame or box with novel highly permeable casting plaster of the present invention to form the mold.

The casting plaster slurry disclosed herein uses alpha-hemihydrate plaster that is screened to increase the percentage of small gypsum particles in the plaster, thereby permitting more material to flow to the outside of the mold to form a tighter skin. Beta-hemihydrate plaster is added to control the amount of alpha material that flows to the skin, thereby creating greater uniformity of foam cellular structure throughout the mold. A foaming agent is added. Sucrose is added to the mixture to protect the formed crystalline structure against thermal shock. Talc, Type 1 Portland cement, and an accelerator are also added in the preferred embodiment to the dry mix that is added to water to create the slurry. During mixing and curing of the plaster, the water to plaster ratio and water temperature are controlled to achieve the desired mold skin thickness, skin strength, and uniformity of cellular structure.

DESCRIPTION OF THE PREFERRED EMBODIMENT

At the request of a customer, a master model of the desired part to be die cast is produced from wood, metal, or plastic. The dimensions of the master model are taken from a blueprint, drawing, or sketch provided by the customer. The master model must duplicate all of the important characteristics needed in the actual production die casting—appearance, dimensional accuracy, and mechanical and chemical properties. Because the simulated die castings are used for prototype purposes, the master model may go through many engineering changes and redesigns before final approval. The word "simulated" is used to differentiate between castings produced in a plastermold and those produced in a steel mold. Only a casting produced in a steel mold can be called a die casting.

Upon final approval by the customer, a duplicate of the master model is produced in conventional fashion using a variety of materials, primarily synthetic plastics and rubbers, to replicate the original master model. Rubber and plastic is invested over the master model in order to develop a cavity or negative of the master model. Additional rubber and plastic is then introduced into the negative cavity to produce a positive of the original master model or "pattern tooling".

The pattern tooling is then placed in a frame or box of wood, metal, or other suitable material capable of containing a slurry of highly permeable plaster. Various types of plaster (calcium sulphate) are blended with certain other ingredients to form a dry material which is then combined with heated free water. This mixture is allowed to become saturated and is then mixed for a specific period of time until a satisfactory slurry is produced. The water to plaster ratio and water temperature are critical to achieve the desired skin thickness, skin strength, and uniform cellular structure of the mold. In the preferred embodiment, the water to plaster ratio is substantially 1:1. The water temperature is maintained at approximately 95° F. to 110° F.

The slurry is then poured over the pattern tooling and allowed to harden. During this process, a heavier sediment in the slurry settles to the face of the pattern tooling and forms a skin which duplicates the exact detail and finish of the pattern tooling. Directly behind the skin, cells are created, much like those of a sponge. These cells give the plaster mold its high permeability. The plaster of the present invention promotes uniformity in the size and distribution of foam cells, which improves the mechanical properties, surface appearance and dimensional accuracy of the final simulated casting. After the plaster slurry hardens sufficiently, the plaster mold is then removed from the pattern tooling and is placed in a drying oven to remove the free water added during the original preparation of the plaster slurry. The set, dry mold is a dihydrate (gypsum) containing two molecules of water in the crystal. It is surface calcined when the mold wall comes in contact with the molten metal, and 1.5 to 2 molecules of water are released and forced through the mold wall, into the cellular structure of the mold body. This action maintains the smooth metal surface by eliminating the gas (steam) in the direction of least resistance.

The plaster mold, after having been thoroughly dried to less than one percent moisture content, is now prepared to receive the molten aluminum and/or zinc alloys. The molten metal is conventionally introduced through a sprue or opening of the mold into the mold cavity, using either gravity, pressure, vacuum, or combinations thereof. The formation of the casting is complete upon solidification of the metal within the cavity. The casting is removed from the plaster mold, at which time the casting is trimmed and ready for shipment or subsequent secondary machining operations.

The novel plaster of the present invention starts with an alpha-hemihydrate gypsum as part of the dry mix. This alpha-hemihydrate gypsum is a calcined gypsum material where 1.5 to 2 water molecules have been removed from the crystals during calcination. Examples of this alpha-hemihydrate gypsum are the conventional gypsum product sold by USG as "White Hydrocal ®" and sold by Georgia Pacific as "Densecal WH ®". This alpha-hemihydrate gypsum is screened to obtain a finer product. The normal consistency of this alpha-hemihydrate gypsum as tested per ASTM 472-79, Methods 5 and 6, has 30 to 32 cc water per 100 gm of plaster. The plunger penetration of this alpha-hemihydrate gypsum is 30 mm, plus or minus 2 mm. In the preferred embodiment, the alpha-hemihydrate gypsum yields the following alcohol wash sieve analysis as per the appendix to ASTM 472-79:

| Sieve size (in microns) | Percent |
| --- | --- |
| Through 30 mesh (−590 micron) | 100% average |
| Through 50 mesh (−297 micron) | 99.99 average |
| Through 100 mesh (−149 micron) | 99.60 average |
| Through 200 mesh (−74 micron) | 97.60 average |
| Through 325 mesh (−44 micron) | 97.30 average |

By screening and the controlled grinding of the alpha-hemihydrate gypsum, the percentage of small gypsum particles in the plaster is increased, thereby permitting more material to flow to the outside of the mold to form a tighter skin. Prepared as described, the alpha-hemihydrate should have a particle size distribution that is 4 to 5% finer in the 0.5 to 44 micron range.

Beta-hemihydrate is then added to the dry mix to control the amount of alpha-hemihydrate that flows to the skin after saturation. This beta-hemihydrate gives greater uniformity of foam cellular structure throughout the mold. The beta-hemihydrate gypsum is atmospherically calcined and reground to meet certain specifications. In the preferred embodiment, the water ratio as per ASTM 472-79, Methods 5 and 6, is 48 to 52 cc per 100 grams of plaster. The plunger penetration is 30 mm plus or minus 2 mm. An alcohol wash sieve analysis as per the appendix to ASTM 472-79 yields the following results:

| Sieve size (in microns) | Percent |
| --- | --- |
| Through 50 mesh (−297 microns) | 99.0% average |
| Through 100 mesh (−149 microns) | 99.0% average |
| Through 200 mesh (−74 microns) | 85.0% average |
| Through 325 mesh (−44 microns) | 70.0% average |

A talc is also added to the premix. In the preferred embodiment, #2882 282 Tex-Ceram Talc ® CAS No. 14807-96-6 is used.

Type 1 Portland cement is added to the premix. When the tricalcium aluminate concentrate of the Portland Cement is 8% or less, the amount of sulphur trioxide should not exceed 2.5%. In the preferred embodiment, the product is to be free of all package lumps and screened through a 30 mesh screen.

An anionic biodegradable foaming agent, such as alkyl naphthalene suphonate, is added. In the preferred embodiment, Petro BAF ® is used.

In the preferred embodiment, the premix that is produced has 80% alpha-hemihydrate and 20% Petro BAF ® foaming agent. This premix blend is kept in a closed container and should not be stored for more than 14 days.

Granulated sugar or sucrose is added as a colloidal retarder in the preferred embodiment to the mixture to protect the formed crystalline structure against thermal shock. This additive lowers the solubility rate of calcium sulphate by coating some of the grains of calcined gypsum.

Dihydrate gypsum which is freshly ground is used in the preferred embodiment of the plaster as an accelerator. The accelerator is screened through a 30 mesh. It is kept in a closed container. In the preferred embodiment, any Terra Alba-type gypsum may be used and is produced by mixing regular beta-hemihydrate plaster with water at a ratio of 70-80 parts water to 100 parts plaster by weight. The water/beta-hemihydrate plaster is then set and dried. The dry cast is then micropulverized to a powder passing through a 30 mesh screen.

A preferred powder mixture of these various materials in the preferred embodiment of the plaster is as follows:

| Materials | Percent | Pounds/Ton |
| --- | --- | --- |
| Alpha-hemihydrate | 51.450 | 1029.0 |
| Beta-hemihydrate | 20.000 | 400.0 |
| Talc | 25.000 | 500.0 |
| Portland cement Type 1 | 1.000 | 20.0 |
| Premix foaming agent | 1.135 | 27.5 |
| Sucrose | 0.050 | 1.0 |

| -continued |  |  |
|---|---|---|
| Materials | Percent | Pounds/Ton |
| Accelerator | 1.125 | 22.5 |

The uniformly blended dry powder is added to free water heated to approximately 95° to 105° F., at a mix of 1:1 (100 cc per 100 gm). The mixture is allowed to soak for one minute, saturating the powder, and is then mixed for approximately one minute with a high speed mixer. The soaking time is to be measured from the moment the powder is added to the water.

When the dissolved plaster is prepared as described, the foam cells produced should have a diameter in the range of 2 to 4 mm. Also, the amorphous structure of the beta-hemihydrate particle will hold the cells in a more uniform suspension. It is desired that the slurry produced by soaking and mixing the powder with heated water have a volume increase during mixing of approximately 90% to 100% in a Pat diameter. Also, the powder, when mixed with water at a ratio of 100 gm/56 cc should produce a Pat minimum diameter of 4.0" with a maximum of 5". The Pat diameter is measured by soaking the powder and water for 1 minute, hand mixing for 1 minute, and pouring the mixture from the container onto a clear plate glass from a height of 2". The preferred setting time for the preferred embodiment is approximately 12 to 15 minutes.

Thus, although there have been described particular embodiments of the present invention of a high permeability metal casting plaster, it is not intended that such references be construed as limitations upon the scope of this invention except as set forth in the following claims. Further, although there have been described certain specifications used in the preferred embodiment, it is not intended that such be construed as limitations upon the scope of this invention, except as set forth in the following claims.

What I claim is:

1. A high permeability metal casting plaster comprising:
   a. a mixture of alpha-hemihydrate gypsum and beta-hemihydrate gypsum;
   b. said alpha-hemihydrate gypsum comprising dry particles such that an average of 100% of said particles have a diameter of no more than 590 microns, and such that at least an average of 97.3% of said particles have a diameter of no more than 44 microns;
   c. said beta-hemihydrate gypsum comprising dry particles such that an average of 99% of said particles have a diameter of no more than 297 microns, and at least an average of 70% of said particles have a diameter of no more than 44 microns; and
   d. wherein the ratio of said alpha-hemihydrate gypsum and said beta-hemihydrate gypsum is approximately 5:2 by weight of said dry gypsum particles.

2. The plaster of claim 1 further comprising an anionic biogradable foaming agent means, added to said alpha-hemihydrate gypsum particles and said beta-hemihydrate gypsum particles in the dry state.

3. The plaster of claim 2 further comprising sucrose added to said mixture.

4. A high permeability metal casting plaster comprising:
   a. a mixture of approximately 5 parts by dry weight of alpha-hemihydrate gypsum particles, wherein approximately 97.3% of said alpha-hemihydrate particles have a diameter of no more than 44 microns, with 2 parts by dry weight of beta-hemihydrate gypsum particles, wherein at least approximately 70% of said particles have a diameter of no more than 44 microns;
   b. an anionic biodegradable foaming agent means added to said mixture of said dry alpha-hemihydrate and beta-hemihydrate particles, said foaming agent means, in conjunction with said mixture, producing a calcined mold of said mixture of alpha-hemihydrate and beta-hemihydrate gypsum having foam cells with diameters in the range of two millimeters to four millimeters.

5. A high permeability metal casting plaster comprising in dry powder form:
   a. approximately 51.45% by weight of alpha-hemihydrate gypsum particles having a maximum diameter of approximately 590 microns and wherein approximately 97.3% of said particles have a maximum diameter of 44 microns;
   b. approximately 20% by weight of beta-hemihydrate gypsum particles, wherein approximately 99% of said beta-hemihydrate particles have a maximum diameter of 297 microns and at least approximately 70% of said beta-hemihydrate particles have a maximum diameter of 44 microns;
   c. approximately 25% by weight of talc;
   d. approximately 1% by weight of type 1 Portland cement;
   e. approximately 1.135% by weight of an anionic biodegradable foaming agent;
   f. approximately 0.05% by weight of sucrose; and
   g. approximately 1.125% by weight of dihydrate gypsum as an accelerator.

* * * * *